United States Patent [19]

Hamersma

[11] Patent Number: 4,490,645

[45] Date of Patent: Dec. 25, 1984

[54] COLOR TELEVISION DISPLAY TUBE

[75] Inventor: Robert Hamersma, Eindhoven, Netherlands

[73] Assignee: U.S. Philips Corporation, New York, N.Y.

[21] Appl. No.: 441,710

[22] Filed: Nov. 15, 1982

Related U.S. Application Data

[63] Continuation of Ser. No. 111,615, Jan. 14, 1980, abandoned.

[30] Foreign Application Priority Data

Feb. 26, 1979 [NL] Netherlands ......................... 7901481

[51] Int. Cl.[3] ...................... H01J 29/70; H04N 5/645; C03C 3/22; C03B 11/00

[52] U.S. Cl. ................................ 313/440; 313/477 R; 358/248; 501/2; 65/33

[58] Field of Search ........... 313/406, 425, 438, 477 R, 313/477 HC, 482, 409, 413, 447, 440; 501/2, 4; 220/2.1 A; 65/33, 47; 358/248

[56] References Cited

U.S. PATENT DOCUMENTS

| | | | |
|---|---|---|---|
| 2,899,575 | 8/1959 | Vincent | 313/482 |
| 3,732,450 | 5/1973 | Mayers | 313/409 |
| 3,973,161 | 8/1976 | Van Leeuwen et al. | 313/447 X |
| 4,160,935 | 7/1979 | Groot et al. | 313/425 |
| 4,323,817 | 4/1982 | Vennix et al. | 358/248 X |

*Primary Examiner*—Palmer Demeo
*Assistant Examiner*—K. Wieder
*Attorney, Agent, or Firm*—Robert J. Kraus

[57] ABSTRACT

A color television display tube having attached to the cone surface abutments in the form of studs or wedges against which the system of deflection coils is placed. The abutments consist of a glass-ceramic material which enables them to be manufactured in a simple manner and allows attachment by means of a rigid lasting glued joint between the abutments and the cone.

3 Claims, 2 Drawing Figures

COLOR TELEVISION DISPLAY TUBE

This is a continuation of application Ser. No. 111,615, filed Jan. 14, 1980, now abandoned.

BACKGROUND OF THE INVENTION

The invention relates to a colour television display tube comprising a glass envelope having a display window, a cone and a neck, the outer surface of the cone having a number of abutments for positioning a system of deflection coils on the envelope of the tube.

Such a colour display tube is known from the article "30 AX-Self aligning 110° in line colour T.V. display" in I.E.E.E. Transactions on Consumers Electronics, Vol. CE-24, No. 3, August, 1978. pp. 481–7. In the colour display tube described in said article the cone comprises three abutments in the form of studs to position the system of deflection coils on the envelope of the tube. The system of deflection coils has three abutments which cooperate with the three studs on the cone. The system of deflection coils further comprises a clamping ring which surrounds the neck of the tube and with which the system of deflection coils is fixed, after it has been slid on the tube until the abutments of the system of deflection coils bear against the studs on the cone. The studs on the cone have a given thickness for each tube, which thickness is chosen so that tolerance in the manufacture of the tube are compensated. These studs, which adhere to the cone, are manufactured from a non-ferromagnetic material.

The studs must satisfy a number of stringent requirements. It must be possible to attach them to the glass surface of the cone in a readily adhering manner for a long period of time. Their dimensions must be accurately reproducible and it must be possible to manufacture them in a simple manner with the desired dimensions to minimize the cost of production of the display tube.

SUMMARY OF THE INVENTION

It is an object of the invention to provide a colour television display tube which is provided at the cone surface with abutments for positioning a system of deflection coils, which abutments satisfy the above-mentioned requirements.

For that purpose, according to the invention a colour television display tube of the kind mentioned in the opening paragraph is characterized in that the abutments consist of a glass-ceramic material. Glass-ceramic material is to be understood to mean herein a thermally divitrified glass obtained from a powdered devitrifiable glass. Starting material for the manufacture of the abutments is powdered glass with a binder which is sintered in a mold and is then heated for some time at such a temperature that devitrification of the glass (crystallization) occurs. In this manner, abutments having the desired shape and dimensions can be manufactured. It has been found that it is possible to attach said sintered crystalline products to the glass surface of the cone in a readily adhering manner for a long period of time by means of an adhesive.

BRIEF DESCRIPTION OF THE DRAWING

The invention will now be described in greater detail, by way of example, with reference to the accompanying drawing, in which.

DESCRIPTION OF THE PREFERRED EMBODIMENTS

Figure 1:
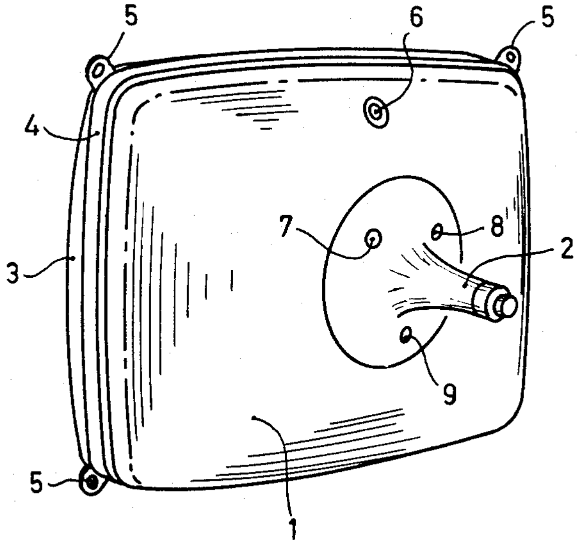
FIG. 1 is a perspective view of a colour television display tube in accordance with the invention.

The colour television display tube shown in FIG. 1 comprises a glass envelope having a cone 1, a neck 2 and a display window 3 which is only partly visible. A metal anti-implosion band 4, which has connection lugs 5 at the corners to facilitate mounting of the tube in a cabinet, is fastened around the transition between the display window and cone of the envelope. The cone 1 has a high voltage lead-through 6 for applying a high potential to an electrically conductive inner coating of the cone (not visible). Near the transition of the cone 1 to the neck 2, three abutments in the form of three studs 7, 8 and 9 are connected to the cone 1. These studs 7, 8 and 9 form the reference points for a system of deflection coils to be slid on the tube. As a result of inaccuracies during the manufacture of such tubes, differences exist in dimensions of portions of the envelope of each tube and differences exist in the positions of the various electron-optical elements in each tube. Therefore, the location of the reference points for a system of deflection coils is fixed for each individual tube by means of the studs 7, 8 and 9. The thicknesses of these studs may differ for each individual tube, depending on the differences in the envelope dimensions, the element positions and the location of the references point on the envelope. After the studs have been provided it is possible to place an accurately manufactured system of deflection coils against the studs 7, 8 and 9 without further positioning and adjustment being necessary.

Figure 2:
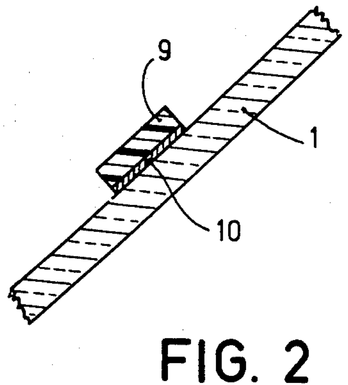
FIG. 2 is a sectional view of an abutment connected to the glass envelope of the tube.

It must be possible to connect the abutments 7, 8 and 9 to the surface of the cone in a readily adhering manner. By manufacturing the abutments from a glass-ceramic material achieved that the coefficient of expansion of the material of the abutments is adapted approximately to the coefficient of expansion of the glass of the cone, which is approximately $90.10^{-7}/°C$. This makes it possible (as shown in FIG. 2) to rigidly secure the abutments on the cone by means of an adhesive 10 (for example, an adhesive known as "Loctite 317" has proved suitable for this purpose).

Starting material for the manufacture of the abutments is a devitrifiable glass in powder form which, mixed with an organic binder, is compressed in a graphite mold to the desired shape and dimensions, is then sintered at a temperature of approximately 640° C. and is finally devitrified at approximately 800° C. In this manner abutments can be simply obtained in any desired shape, for example studs or wedge-like abutments.

Devitrifiable glasses suitable for the purpose of the invention are, for example, zinc borate glasses of the composition: 60–70% by weight of ZnO, approximately 19–25% by weight of $B_2O_3$, approximately 0–5% by weight of MgO and approximately 10–16% by weight of $SiO_2$. Other suitable devitrifiable glasses are, for example, barium borate glasses of the composition: 60–65% by weight of BaO, 20–25% by weight of $B_2O_3$, 12.5–17% by weight of $SiO_2$, 0–7.5% by weight of ZnO and 0–7.5% by weight of $ZrO_2$.

What is claimed is:

1. A color television display tube comprising a glass envelope having a display window, a cone and a neck, the outer surface of said cone having a number of abutments for positioning a system of deflection coils on the envelope, characterized in that said abutments comprise separately molded, thermally devitrified glass ceramic studs attached to the envelope, each stud being formed by mixing powdered devitrifiable glass with an organic binder, compressing the mixture in a mold to a desired shape having predefined dimensions, and heating the mixture to effect devitrification, the coefficient of expansion of the glass studs being substantially the same as the coefficient of expansion of the envelope.

2. A display tube as in claim 1 characterized in that said powdered devitrifiable glass consists essentially of 60–70% by weight of ZnO, 19–25% by weight of $B_2O_3$, 0–5% by weight of MgO and 10–16% by weight of $SiO_2$.

3. A display tube as in claim 1 characterized in that said powdered devitrifiable glass consists essentially of 60–65% by weight of BaO, 20–25% by weight of $B_2O_3$, 12.5–17% by weight of $SiO_2$, 0–7.5% by weight of ZnO and 0–7.5% by weight of $ZrO_2$.

* * * * *